June 7, 1927.
W. M. REASON
1,631,157
TRANSMISSION LOCK
Filed Dec. 14, 1922
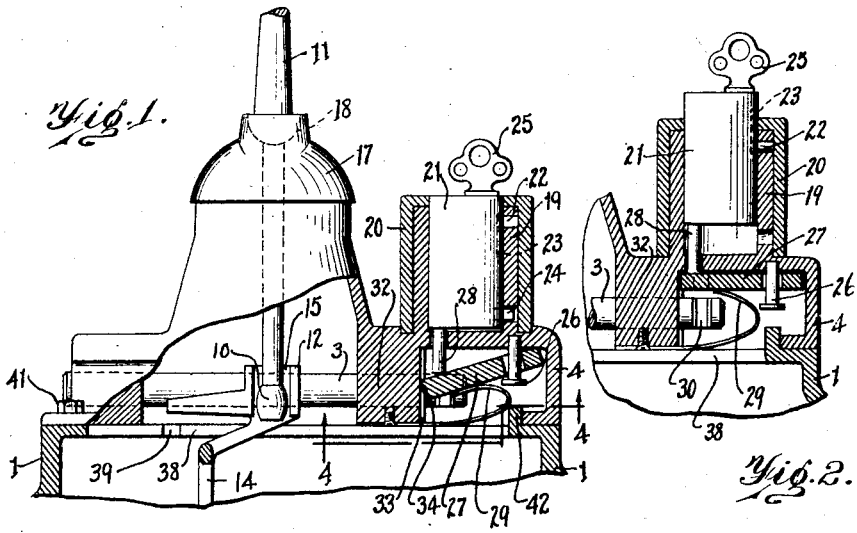
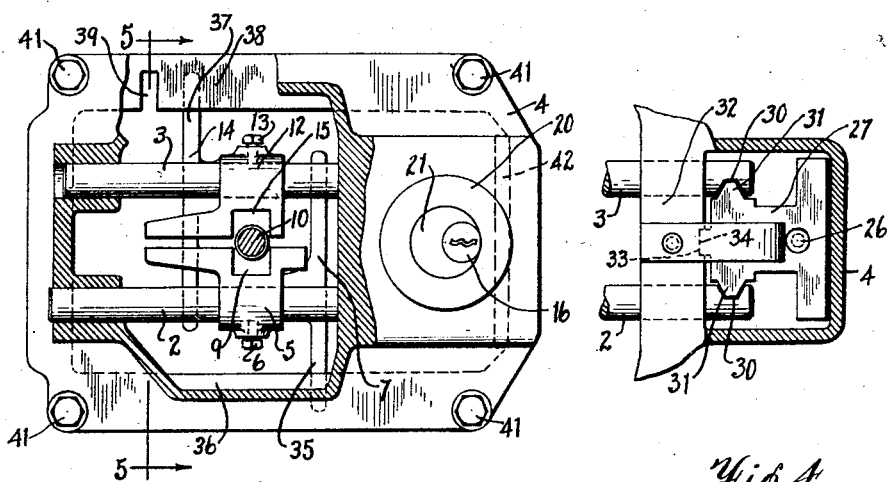
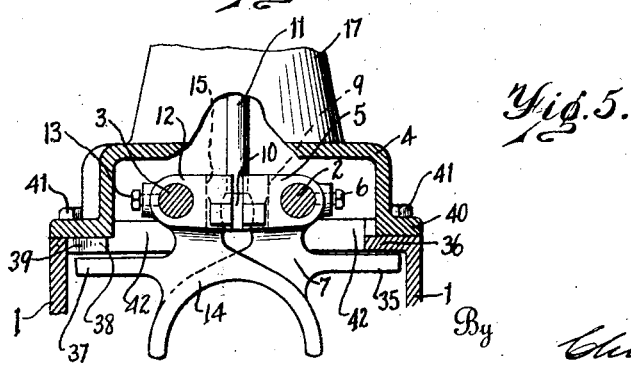
Inventor
Walter M. Reason.
By Charles E. Winn
Attorney Patented June 7, 1927.

1,631,157

UNITED STATES PATENT OFFICE.

WALTER M. REASON, OF PONTIAC, MICHIGAN, ASSIGNOR TO ELIZABETH BALLAMOS, OF PONTIAC, MICHIGAN.

TRANSMISSION LOCK.

Application filed December 14, 1922. Serial No. 606,943.

This invention relates to transmission locks and the object of the invention is to provide a lock for locking the transmission gears of an automobile in the neutral position. Another object of the invention is to provide a transmission lock which cannot be easily tampered with and which will not easily get out of order. A further object of the invention is to provide a lock for the transmission gears of an automobile in which the device can only be locked when the gear shift is in the neutral position. The principal object of the invention is to provide a means for preventing theft of an automobile by locking the gear shifting mechanism so that none of the gears can be brought to driving engagement and also to provide a means whereby the gear shift lever is locked and held from movement. A further object of the invention is to provide a transmission cover carrying the gear shifting mechanism and locking mechanism therefor and a transmission casing for the variable speed gears, the construction being such that the transmission cover cannot be removed from the transmission casing when the gear shifting mechanism is locked. These objects and the several novel features of the invention are hereinafter more fully described and claimed and the preferred form of construction by which these objects are attained is shown in the accompanying drawings in which—

Fig. 1 is a section through a transmission cover and lock embodying my invention.

Fig. 2 is a similar section showing the locking mechanism in the unlocked position.

Fig. 3 is a plan view partially in section to show the construction.

Fig. 4 is a section taken on line 4—4 of Fig. 1.

Fig. 5 is a section taken on line 5—5 of Fig. 3.

As will be understood from Fig. 1 the variable speed gears are mounted in the transmission casing 1 beneath the gear shifting mechanism shown in Fig. 1. A pair of shafts 2 and 3 are slidably mounted in the cover 4 for the casing. A member 5 shown in Figs. 3 and 5 is secured to the shaft 2 by the set screw 6 and the member 5 carries a yoke 7 for operating the low speed and reverse gears. The member 5 is provided with a notch 9 to receive the lower end 10 of the gear shift lever 11 as will be readily understood from Figs. 1 and 3. A member 12 similar to the member 5 is secured to the shaft 3 by the set screw 13 and carries a yoke 14 for shifting the intermediate and high speed gears, the member 12 being also provided with a notch 15 for receiving the end 10 of the gear shift lever, and when the gears are in neutral position the notches 9 and 15 are positioned opposite each other as shown in Fig. 3. The gear shift lever 11 is provided with a ball shaped portion 18 which fits in a socket provided in the upwardly extending portion 17 of the transmission covering and provides a pivot for the gear shift lever. The cover 4 for the transmission casing is provided with an upwardly extending recessed portion 19 having a case hardened tool steel shell 20 which is made a press fit thereon and prevents tampering with the lock or cutting off the locking portion of the transmission cover 4. A longitudinally movable lock barrel 21 is provided in the recess of the portion 19 and is held from rotation by a pin 22 engaging in a groove 23 provided in the non-rotatable portion 21 of the lock. The lock is provided with a locking bolt 24 which may be moved outwardly or withdrawn by rotation of the key 25 which rotates the cylindrical portion 16 of the lock as will be readily understood. A pin 26 is secured in the cover 4 as shown in Figs. 1, 2 and 4 and a locking block 27 is supported on the pin 26. A pin 28 is secured to the outer portion 21 of the lock and extends through an aperture in the cover 4 and is adapted to engage the locking block 27, a flat spring 29 being secured to the cover 4 and being adapted to hold the block 27 in contact with the pin 28. As shown in Fig. 4 the shafts 2 and 3 are provided with notches 30 which are positioned opposite each other when the gear shifting mechanism is in the neutral position. The block 27 is provided with lugs 31 which are adapted to fit in the notches 30 when the device is in the neutral position and prevent operation of the gear shift by movement of the shafts 2 and 3. The cover 4 is provided with a depending portion 32 in which the shafts 2 and 3 are slidably mounted and this portion 32 is provided with a shallow groove 33 in which the lug 34 on the block 27 is adapted to engage the groove thus forming a guide for the locking block. The yoke 7 is provided with an arm 35 which extends beneath the flange 36 of the casing 1 and the yoke 14 is provided with an arm 37 which extends beneath the flange 38 of the casing 1 as shown in Figs. 3 and 5, the flange 38 being provided with a notch 39 through which the arm 37 may be moved to position beneath the flange 38.

To assemble the device the edge 40 of the cover 4 is rested on the flange 36 of the casing 1 in an angular position so that as the cover 4 is turned down to position the opposite edge thereof on the flange 38, the arm 35 is moved to position beneath the flange 36. The yoke 14 at this time must be forward of the position shown in Fig. 3 so that the arm 37 will pass through the notch 39. At this time the cover is secured to the transmission by the bolts 41 and the yoke 14 may be moved back to the neutral position shown in Figs. 1 and 3. When this has been done the locking mechanism is in the unlocked position shown in Fig. 2.

To lock the device the lock barrel 21 is moved downward from the position shown in Fig. 2 to that shown in Fig. 1, the pin 28 forcing the locking block 27 to the locking position with the lugs 31 engaging the notches 30 of the shafts 2 and 3 as shown in Figs. 1 and 4. At this time the key is turned which forces the locking bolt 24 outwardly into the recess provided therefor in the portion 19 which holds the parts in the locked position. At this time the bolts 41 may be removed but it will be impossible to remove the cover from the casing on account of the arms 35 and 37 engaging beneath the flanges 36 and 38. An upwardly extending flange 42 is provided at the end of the casing 1 as shown in Fig. 1 behind which the edge of the cover 4 engages. Without this construction the bolts 41 might be removed and by moving the entire cover and locking mechanism to the left of Fig. 1 or 3 the arm 37 could be brought to position beneath the notch 39 at which time the transmission cover and lock could be removed from the transmission casing 1. By providing the flange 42 the transmission cover cannot be so moved and due to the arms 37 and 35 extending closely beneath the flanges 36 and 38 the edge of the cover cannot be lifted to sufficient height to clear the upwardly extending flange 42. To unlock the device the key 25 is inserted in the rotatable portion 16 of the lock and is turned to retract the locking bolt 24 at which time the spring 29 forces the block 27 upwardly which, due to its engagement with the pin 28, forces the lock and barrel upwardly to the position shown in Fig. 2 thus unlocking the device. When the device is unlocked the cover may be removed from the casing 1 by withdrawing the bolts 41 and shifting the yoke 14 by means of the gear shift lever 11 to position beneath the lock 39, whereupon by tilting the transmission cover on the edge 40 the arm 37 may be moved through the notch 39 to allow removal of the transmission cover and lock.

A feature and object of vital importance in this device resides in the general structure employed to not only lock the gear operating mechanism in neutral position, but further in thus locking the gear operating mechanism to prevent removal of the cover from the case. Many transmission locks heretofore in use are provided in the cover of the transmission case and lock the transmission operating mechanism but, removal of the cover (which merely requires the taking out of a few screws), removes the operating lever and lock and enables a person, if bent on theft, to drive the car away as it only requires after removal of the cover to shift the gears by a small bar of any type as for instance a large screw driver. Thus such locks in reality do not prevent the theft of a car. By my arrangement in which the cover is locked to the case when the gear shifting mechanism is locked such theft and tampering with the mechanism is prevented.

From the foregoing description it becomes evident that the device is very simple and efficient in operation, will not easily get out of order, is composed of few parts and is of consequent low manufacturing cost, and provides a device which accomplishes the objects described.

Having thus fully described my invention, what I claim is—

1. A transmission lock including a pair of operating members for the transmission, the said members being each provided with a notch adapted to be brought to opposed relation when in the neutral position, a lock comprising a longitudinally movable non-rotatable portion, a rotatable portion therein operable by a key, a locking block pivotally secured within the transmission casing and having lugs thereon adapted to engage in the notches of the operating members when in the neutral position, a pin on the longitudinally movable portion of the lock engaging the locking block, a spring holding the locking block in engagement with the said pin, a locking bolt carried by the non-rotatable portion of the lock adapted when extended to prevent longitudinal movement of the lock, the arrangement being such that rotation of the key retracts the locking bolt and allows upward movement of the locking block and lock by the spring.

2. A transmission lock including a pair of operating members for the transmission, the said members being each provided with a notch adapted to be brought to opposed relation when in the neutral position, a lock comprising a longitudinally movable non-rotatable portion, a rotatable portion therein operable by a key, a locking bolt adapted to be extended or retracted by rotation of the key, the locking bolt when in the extended position preventing longitudinal movement of the lock, a locking block pivotally secured within the transmission cover and having lugs thereon adapted to engage in the notches of the operating members when in the neutral position, a pin extending longitudinally from the non-rotatable portion of the lock and engaging the locking block, a spring holding the locking block in engagement with the said pin and means carried by the operating members preventing removal of the cover from the casing when in the neutral position.

In testimony whereof, I sign this specification.

WALTER M. REASON.